Nov. 23, 1954  F. J. BRADBURY  2,695,088
POWER TRANSMISSION SYSTEM, INCLUDING FRICTION CLUTCH
Filed Feb. 14, 1952  6 Sheets-Sheet 1

Inventor
Frederick James Bradbury
by Stevens, Davis, Miller & Mosher
his attorneys

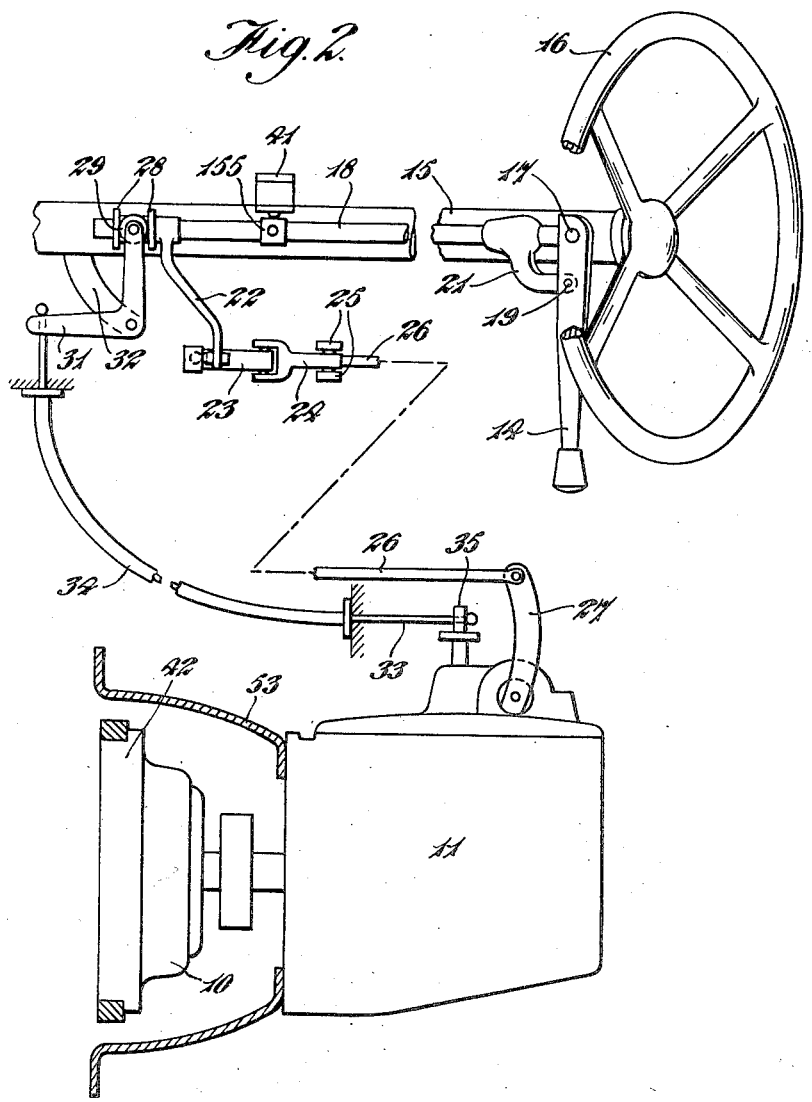

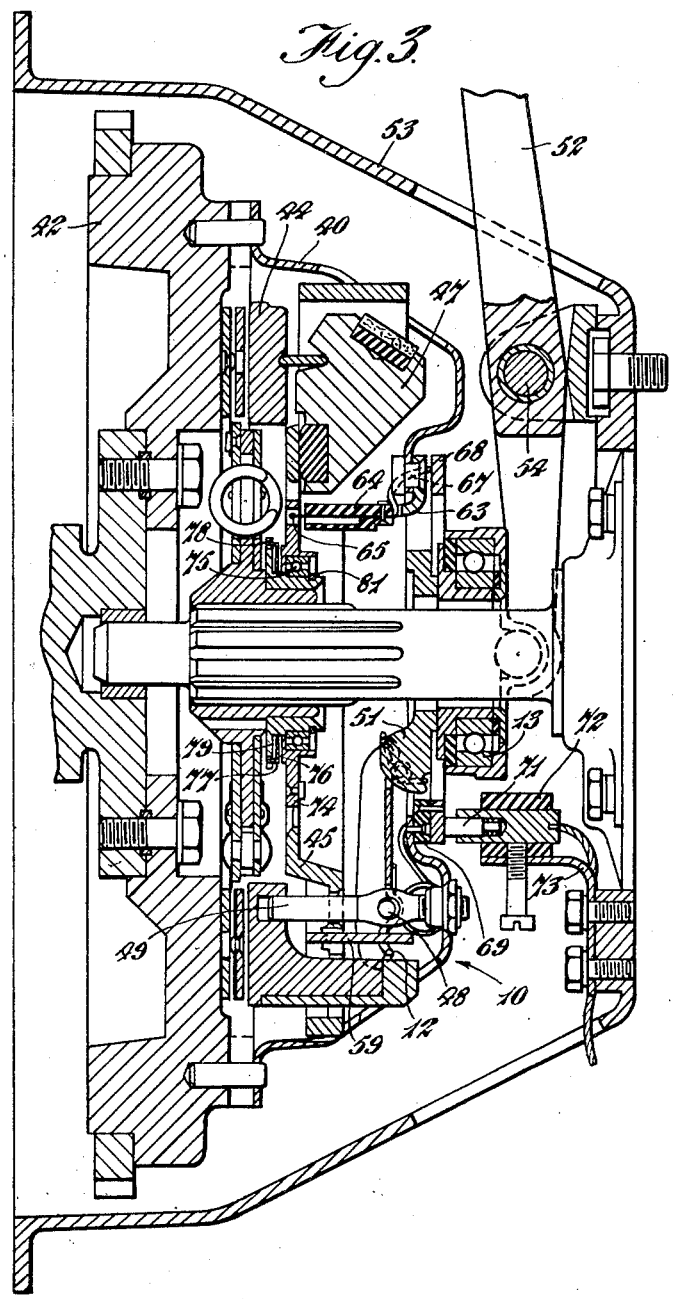

Nov. 23, 1954     F. J. BRADBURY     2,695,088
POWER TRANSMISSION SYSTEM, INCLUDING FRICTION CLUTCH
Filed Feb. 14, 1952                                     6 Sheets-Sheet 4
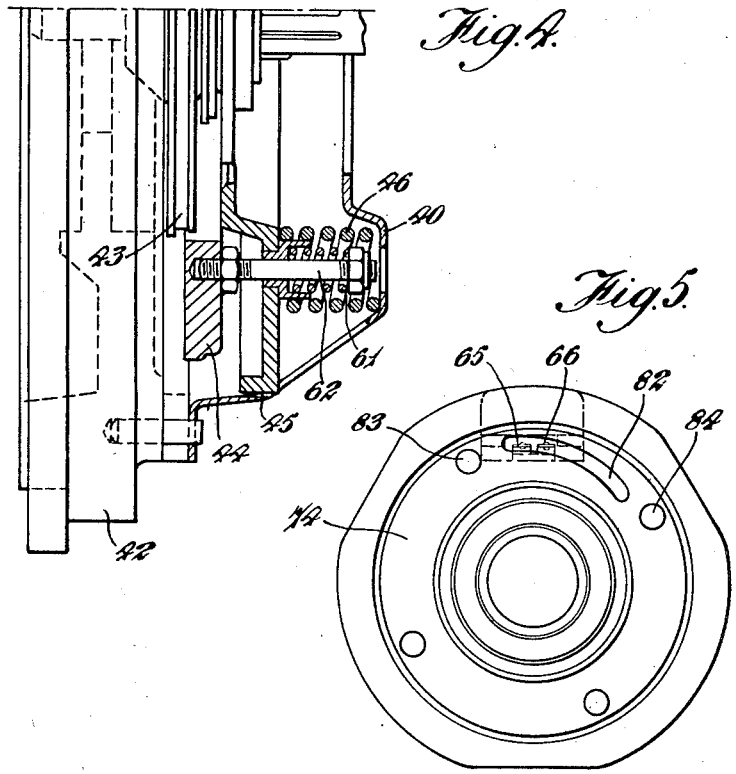
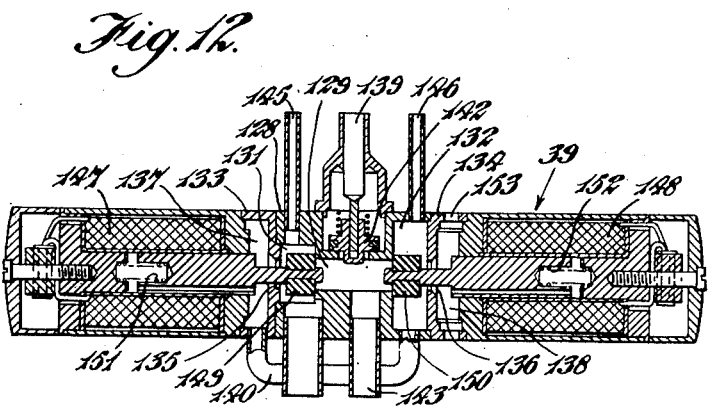

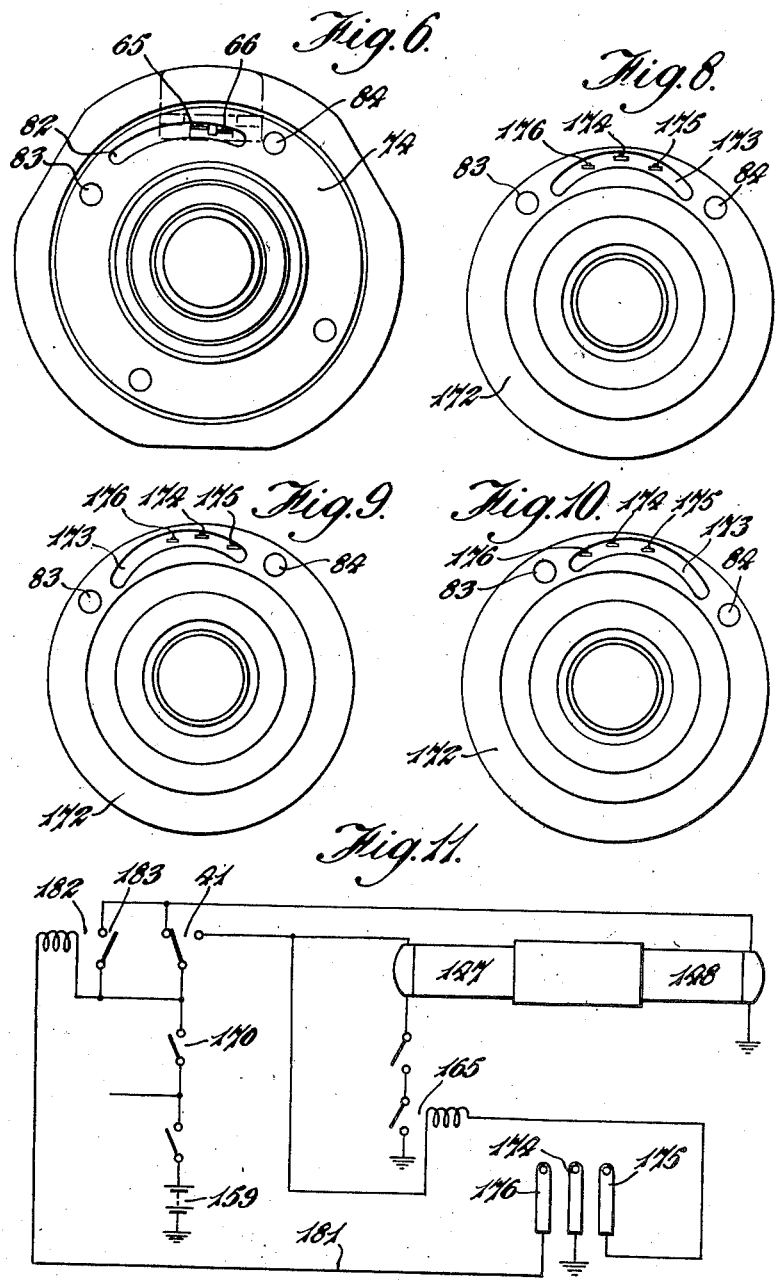

Nov. 23, 1954  F. J. BRADBURY  2,695,088
POWER TRANSMISSION SYSTEM, INCLUDING FRICTION CLUTCH
Filed Feb. 14, 1952  6 Sheets-Sheet 6

United States Patent Office 2,695,088
Patented Nov. 23, 1954

2,695,088

POWER TRANSMISSION SYSTEM, INCLUDING FRICTION CLUTCH

Frederick James Bradbury, Leamington Spa, England, assignor to Automotive Products Company Limited, Leamington Spa, England Application February 14, 1952, Serial No. 271,605

Claims priority, application Great Britain February 20, 1951

5 Claims. (Cl. 192—91)

This invention relates to power transmission systems including friction clutches, such as the systems used for transmitting power from the engines of road vehicles to the road wheels, and has for its object to provide means for controlling the engagement of the clutch in such a system.

According to the invention, in a power transmission system including a friction clutch having resilient means providing an engaging load, and means for disengaging said clutch in opposition to the engaging load, the said means are controlled by an electrical control circuit including contacts opened and closed by variations in the speed relation of the driving and driven members of the clutch when the latter is disengaged, so as to permit engagement only at a predetermined speed relation between the driving and driven members.

The following description relates to a vehicle transmission system incorporating the invention, the system being that which is described in the specification of my British Patent Application No. 4145/51, in which the shifting of gears in a gearbox through a mechanical linkage effects automatically, through clutch and throttle control systems, the operations of the clutch and throttle necessary to produce a satisfactory gear change, thus reducing the operation of gear changing to the movement of a single lever.

In the drawings to which the description makes reference:

Figure 2 is a diagram showing the mechanical linkage by which the movement of the gears in the gearbox is effected;

Figure 3 is a sectional elevation of the clutch;

Figure 4 is a sectional elevation of the clutch in another radial plane only one half being shown;

Figure 5 is an end elevation of the centre portion of the clutch, showing the contacts in the open position;

Figure 6 is a view similar to Figure 5, showing the contacts in the closed position;

Figures 8, 9 and 10 are three diagrams showing three positions of the contact system of the clutch arrangement shown in Figure 7;

Figure 11 is a diagram showing the electrical connections to the clutch contacts in the clutch arrangement shown in Figures 7 to 10; and Figure 12 is a sectional elevation of the solenoid-controlled valve.

Figure 1:
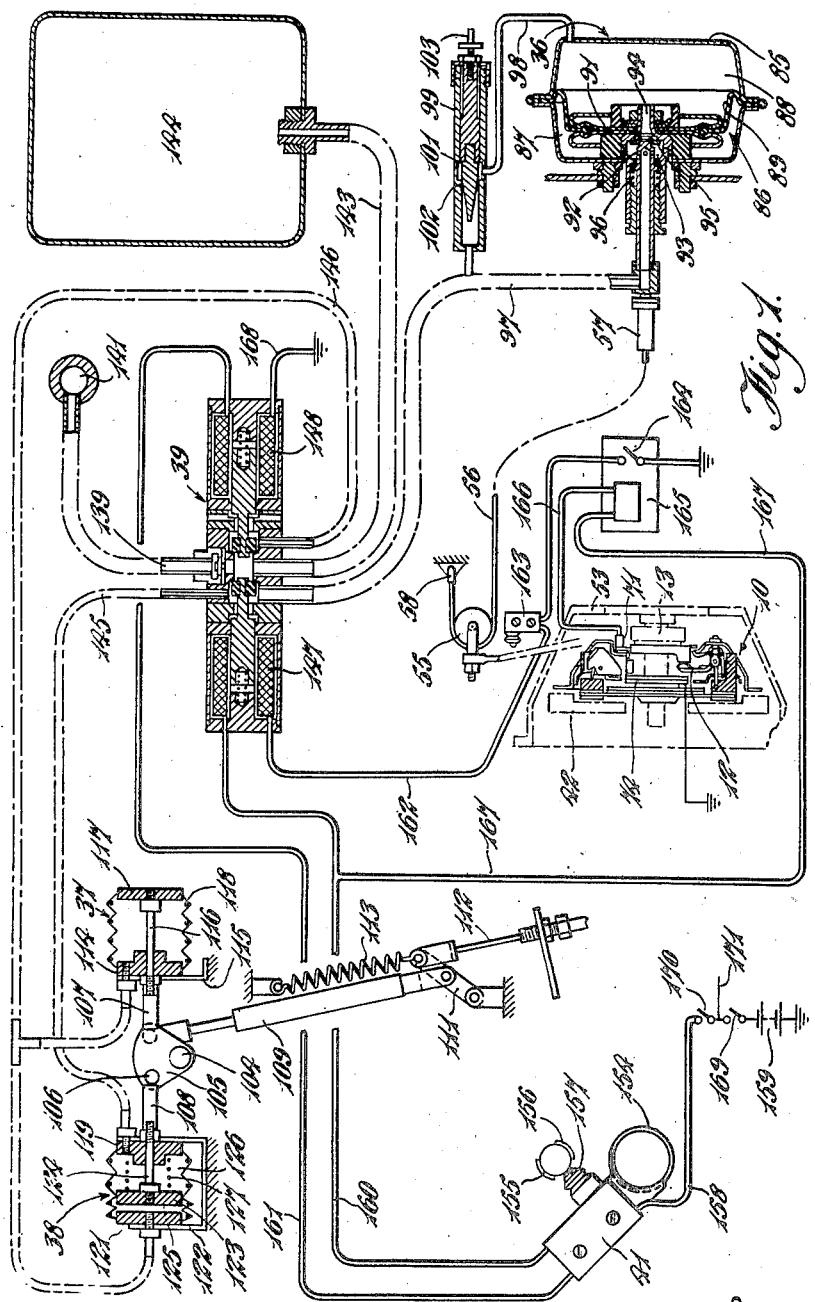
Figure 1 is a diagram showing the various elements of the clutch and throttle control systems, together with the pneumatic and electrical connections.
Figure 7:
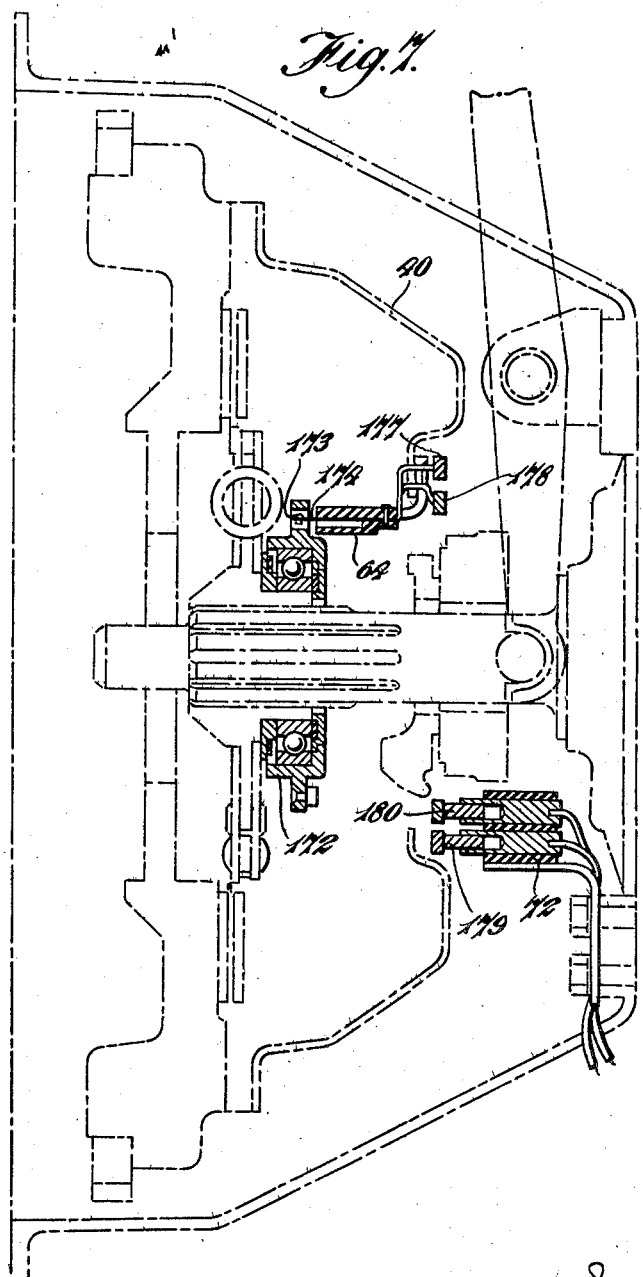
Figure 7 is a view similar to Figure 3 but showing a modification.

The friction clutch of the vehicle transmission which is shown at 10 in Figures 1 and 2 is of the so-called centrifugal type, which engages automatically at a predetermined engine speed, and disengages automatically when the engine speed falls below the predetermined value. The gear-box, shown at 11 in Figure 2, provides four forward speeds and reverse, synchronizing mechanism being provided for the second, third and fourth forward speeds, and, if desired, for first speed also. The clutch 10 is provided with release levers 12 acted on by a release bearing 13 to disengage the clutch independently of the centrifugal mechanism.

The shifting of the gears is effected manually by means of a lever 14 (Figure 2) mounted on the steering column 15 so as to lie just below the steering wheel 16, the lever being pivotally connected at 17 to a shaft 18 lying parallel to the steering column and mounted for both sliding and turning movements thereon. The lever 14 fulcrums at 19 on a member 21 which is held against axial movement but is capable of turning with the shaft 18, so that movement of the lever in a plane parallel to that of the steering wheel 16 turns the shaft 18, whilst movement of the lever in a plane perpendicular to that of the steering wheel moves the shaft 18 axially. An arm 22 fixed to the shaft 18 adjacent the lower end of the steering column is coupled, by a link 23, to a bell crank-lever 24 mounted in suitable bearings 25 on the vehicle, the bell-crank lever 24 being in turn connected, by a link 26, to a lever 27 on the gear-box. The lever 27 operates to displace any selected shift bar of the gear-box and thus engage the gears.

Below the arm 22, a pair of spaced flanges 28 are secured to the shaft 18, and between these flanges is engaged a roller 29 mounted on one arm of a bell-crank lever 31 fulcrumed on a bracket 32, the other arm of the lever 31 being connected, by a cable 33 working in a sheath 34, to a lever 35 on the gear-box, this lever acting to select the appropriate shift bar in the gear-box. Thus axial movement of the shaft 18 effects the selection of the appropriate shift bar through the bell-crank lever 31 and cable 33, whilst turning movement of the shaft 18 engages the gears through the arm 22, link 23, bell-crank lever 24 and link 26.

A vacuum servo-motor 36 (Figure 1) is provided to operate the clutch disengaging mechanism, and two further vacuum servo-motors 37 and 38 actuate the throttle valve (not shown) in the induction system of the vehicle engine, the throttle valve being also controllable by a pedal in the usual manner, but only subject to the over-riding control of the servo-motors. The servo-motor 37 acts to close the throttle, and the servo-motor 38 to open it.

The servo-motors are controlled by a solenoid-operated valve unit 39 (Figures 1 and 4), the energisation of the solenoids being controlled by an electric switch 41 actuated by turning movement of the shaft 18, and the electric contacts, described hereinafter, controlled by the relative speeds of rotation of the driving and driven members of the clutch.

The clutch 10 (Figures 1 and 3 to 6) comprises the usual cover-plate 40 bolted to the engine flywheel 42, a driven plate 43 which, when the clutch is engaged, is clamped between the flywheel 42 and a pressure plate 44, a spring abutment plate 45 interposed between the pressure plate 44 and the cover plate 40, springs 46 (Figure 4) acting between the cover plate 40 and the spring abutment plate 45, and centrifugally actuated weights 47 (Figure 3) acting between the spring abutment plate 45 and the pressure plate 44. The flywheel 42, cover plate 40, pressure plate 44 and spring abutment plate 45 together constitute the driving member of the clutch, the driven plate 43 constituting the driven member. The release levers 12 are fulcrumed at 48 on studs 49 located in the cover plate 40, and engage at their inner ends with a release lever plate 51 which is in constant engagement with the release bearing 13. A clutch operating lever 52 is fulcrumed on the clutch housing 53 at 54, one end of the lever 52 being pivotally connected to the release bearing 13, and its other end carrying a pulley 55 over which passes a cable 56, one end of the cable being secured to a pull rod 57, and the other to a fixed anchorage 58. The outer ends of the release levers 12 are connected by links 59 to the spring abutment plate 45 so that movement of the inner ends of the said levers towards the flywheel pulls the spring abutment plate away from the flywheel to compress the springs 46, and so release the clutch. The pressure plate is urged towards the spring abutment plate by return springs 61 (Figure 4) surrounding studs 62 screwed into the pressure plate.

The approach of the spring abutment plate 45 towards the flywheel 42 is limited by the release bearing 13, through the release lever plate 51, release levers 12 and links 59, and the springs 61 urge the pressure plate 44 towards the spring abutment plate 45, thus urging the centrifugal weights 47 inwardly. The cable 56 is so adjusted that when the servo-motor 36 is de-energized and the clutch is not rotating, so that the centrifugal weights are inoperative, the driven plate is free between the flywheel and the pressure plate. Outward movement of the weights 47, however, moves the pressure plate away from the spring abutment plate 45 until the driven plate is engaged, and produces a reaction on the spring abutment plate 45 which compresses the springs 46. The outward movement of the weights 47 is limited, so that withdrawal of the spring abutment plate by the release levers 12 pulls the pressure plate away from the flywheel to release the clutch when the clutch is rotating fast enough to cause engagement under centrifugal force.

A bracket 63 riveted to the cover plate 40 carries a block 64 of insulating material on which are mounted two resilient contact fingers 65 and 66, which project towards the driven plate 43. The contact finger 65 is connected directly to the cover plate 40 but the contact finger 66 is insulated, and is connected by a conductor 67 to a slip ring 68 mounted by means of insulating blocks 69 on the cover plate 40. A spring-loaded brush 71, mounted in an insulating block 72 on a bracket 73 bolted to the clutch housing 53, is in constant engagement with the slip ring 68.

A cam ring 74 is mounted on the hub of the clutch driven plate 43, on a ball bearing 75, friction means being incorporated between the cam ring 74 and the driven plate so that the former tends to rotate with the latter, but is able, when constrained so to do, to turn in relation to it. The friction means comprise a washer 76 of friction material located against the face of the cam ring 74, a flat metal washer 77 in contact with the opposite face of the washer 76, and held against rotation relative to the driven plate 43 by bent-over nibs 78 engaging in notches in the driven plate, and a crimped resilient metal washer 79 interposed between the washer 77 and the driven plate, the whole assembly being compressed axially by a spring ring 81 located in a groove in the hub of the driven plate 43, and engaging the inner race of the ball bearing 75. The cam ring 74 is provided with an eccentric arcuate cam slot 82 (Figure 5) into which the contact fingers 65 and 66 extend, and with two stop members 83 and 84 which, by co-operating with the insulating block 64, limit the angular movement of the cam ring 74 relative to the driving member of the clutch. The cam slot 82 is so arranged that when the clutch driving member is rotating faster than the driven member, so that the cam ring 74 is dragged backwardly by the driven plate, the contact fingers are free in the slot 82, but when the clutch driving member is lagging behind the driven member, so that the cam ring is dragged forwardly by the driven plate, the contact fingers are brought into engagement with the outer edge of the cam slot, and are thus connected together electrically.

The clutch-operating servo-motor 36 comprises a casing 85 in which are mounted a diaphragm 86 dividing the casing into two chambers 87 and 88, the chamber 87 being open to the atmosphere. The central portion of the diaphragm 86 is rigid, and is surrounded by a flexible portion 89, the central rigid portion carrying a valve body 91 in which is mounted, for limited sliding movement, the pull rod 57 to which the cable 56 is connected. The pull rod 57 is tubular, being closed at its end which enters the valve body 91, and having radial ports 92 opening into a chamber 93 in the valve body, which chamber 93 is connected by a port 94 to the chamber 88 of the servo-motor. The pull rod 57 carries a valve disc 95, and a spring 96 acting on the pull rod urges the disc 95 to a position in which it closes the port 94, thus isolating the chamber 93 from the working chamber 88. A conduit 97 connects the hollow pull rod 57 to the solenoid-operated valve unit 39. A by-pass passage 98 connects the working chamber 88 directly to the conduit 97, a variable restricting device 99 being interposed in the passage 98. The device 99 comprises a tapered needle 101 co-operating with an orifice 102, and the needle 101 is connected by a rod 103 to the accelerator pedal of the vehicle, so that the degree of restriction varies with the position of the accelerator pedal.

The throttle controlling system, including the servo-motors 37 and 38, is shown in Figure 1. The carburettor and throttle valve are omitted, but the throttle valve spindle is shown at 104, a sector shaped plate 105 being fixed thereon. A pin 106 projects from one side of the plate 105, at a point offset from the axis of the spindle 104, to co-operate with two movable stops 107 and 108. Pivotally attached to the other side of the plate 105, at a point offset from the axis of the spindle 104, is one end of a link 109 capable of extending or contracting and urged by internal springs to return to its normal length, the other end of the link 109 being pivoted to an arm 111 connected by a cable 112 to the normal throttle control (not shown). A return spring 113 for urging the throttle valve to the closed position is also connected to the arm 111.

The stops 107 and 108 are associated respectively with the servo-motors 37 and 38, which are in the form of bellows. The servo motor 37 has an inner end plate 114 fixed to a bracket 115, the stop 107 being carried by a rod 116 passing through the plate 114 and secured to an outer end plate 117, a spring 118 being incorporated in the bellows to urge the end plates apart. The servo-motor 38 has inner and outer end plates 119 and 121 both fixed to a bracket 122, and a movable intermediate plate 123 carrying a rod 124 slidable in the inner end plate 119, the rod 124 carrying the stop 108. The servo-motor 37, and the chamber 125 of the servo-motor 38 between the outer end plate 121 and the intermediate plate 123 have a common connection to the solenoid-operated valve unit 39 and the other chamber 126 of the servo-motor 38 has a separate connection to the said valve unit. A spring 127 in the chamber 126 urges the intermediate plate 123 towards the outer end plate 121.

The solenoid operated valve unit 39, which is shown in detail in Figure 12, comprises a body 128 having an axial bore 129 which is counterbored at both ends to provide recesses 131 and 132, the recesses being closed by end caps 133 and 134 formed with central openings 135 and 136 leading respectively into chambers 137 and 138 in the end caps. A conduit 139, connected to the inlet manifold of the engine (indicated at 141 in Figure 1) leads into the bore 129, a non-return valve 142 being provided to prevent flow of air into the bore 129 from the inlet manifold. Another conduit 143 connects the bore 129 to a vacuum reservoir 144 (Figure 1). A conduit 145 leads from the recess 131 to the chamber 126 in the servo-motor 38, and a conduit 146 leads from the recess 132 to the chamber 125 of the servo-motor 38 and to the servo-motor 37. The conduit 97 leads into the recess 131. The recess 132 and the chamber 137 are connected by a conduit 140, shown, for clearness, as an external pipe, but conveniently formed in practice as a bore in the body 128. Solenoids 147 and 148 are mounted respectively on the end caps 133 and 134, the armatures of the solenoids carrying respectively valve heads 149 and 150 located in the recesses 131 and 132. The armatures are urged inwardly by springs 151 and 152 respectively to seat the valve heads on the shoulders at the respective ends of the recesses so as to close the ends of the bore 129, energisation of the respective solenoids drawing the valve heads outwardly so that they close respectively the openings 135 and 136 in the end caps 133 and 134. Air inlet ports 153 are provided in the end cap 134.

The switch 41 is a two-way switch (Figure 1) and is mounted, by means of a bracket clip 154, on the steering column 15 of the vehicle, the switch being operated by cam strips 155, 156 secured to the shaft 18, and the arrangement being such that when the shaft 18 is in a position corresponding to the engagement of any gear, one or other of the cam strips 155, 156 engages the operating plunger 157 of the switch 41 and presses it inwardly. The initial turning movement of the shaft 18 when a gear is disengaged causes the plunger 157 to ride off the cam strip with which it has been engaged, thus reversing the switch 41, which remains in the reversed position until another gear is engaged.

A common contact in the switch 41 is connected by a conductor 158 (Figure 1) to one pole of the battery 159, and the other two contacts are connected respectively by conductors 160 and 161 to the solenoids 147 and 148, the contact connected to the solenoid 147 being that which is engaged with the common contact when any gear is engaged, and the contact connected to the solenoid 148 being that which is engaged with the common contact when the gears are disengaged. The other end of the solenoid 147 is connected by a conductor 162 to a normally open switch 163 which is closed when the clutch is disengaged by the servomotor 36, being, for example, mechanically actuated by the operating lever 52, the other lead from the switch 163 being earthed through the contacts 164 of a relay 165, the contacts 164 being open when the relay 165 is de-energized. The brush 71 is connected by a conductor 166 to the coil of the relay 165, which is in turn connected by a conductor 167 to the conductor 160. The pole of the battery other than that to which the conductor 158 is connected, is earthed. The other end of the solenoid 148 is earthed through a conductor 168. The relay 165 may be omitted, the switch 163 being connected directly to the brush 71, so that the circuit of the solenoid 147 is controlled directly by the contacts 65 and 66.

The conductor 158 is connected to the battery 159 through the ignition switch 169 of the vehicle, and through a main control switch 170 for the transmission control system, the two switches 169 and 170 being in series. The conductor leading to the vehicle ignition system is shown at 171.

The transmission control system above described operates in the following manner. When the gear lever 14 is in the neutral position, and both the main switch 170 of the control system and the ignition switch 169 are closed, the solenoid 148 is energized, thus moving the valve head 150 from the position shown in Figure 12, in which it cuts off the chamber 138 from the suction, to a position in which it closes the opening 136, and so cuts off the recess 132 from the air inlet ports 153. The conduit 146 is thus connected directly to suction, and the conduits 145 and 97 are connected to suction by way of the recess 131, opening 135, chamber 137 and conduit 140. Suction is thus applied to the clutch-operating servo-motor 36, to both chambers 125 and 126 of the servo-motor 38, and to the servo-motor 37. The clutch is therefore disengaged through the release levers 12 pulling back the spring abutment plate 45 against the springs 46, and the stop 107 is projected inwardly to limit the opening of the throttle valve by restricting movement of the pin 106, due to the suction acting in the servo-motor 37. Since suction acts on both sides of the intermediate plate 123 of the servo-motor 38, the stop 108 is not moved.

When the lever 14 is moved to engage a gear, the switch 41 is changed over, and the solenoid 148 is de-energised. Assuming that the vehicle is stationary, so that the driven member of the clutch is not moving, and cannot therefore be running faster than the driving member, the contacts 65 and 66 remain open, and the relay 165 is not energised, so the circuit through the solenoid 147 is not completed, and the clutch servo-motor 36 leaves the clutch free for centrifugal engagement. The de-energisation of the solenoid 148 allows the throttle stop 107 to withdraw, and as the solenoid 147 is not energised the stop 108 remains withdrawn. The driver, by operating the throttle valve through the normal throttle pedal, speeds up the engine until the clutch engages under centrifugal force, and the vehicle moves off.

When a change is made from one gear to another, with the vehicle in motion, the first movement of the gear lever 14, before disengaging, through movement of the shaft 18 and the connecting linkage, the previously engaged gear, changes over the switch 41 to close the circuit of the solenoid 148, there being sufficient lost motion in the linkage for the switch plunger 151 to ride off the cam strip 148 or 149 before the actual disengagement of the gear. The resulting movement of the valve head as described above, applies suction to the clutch servo-motor 36 and to the throttle servo-motors 37 and 38, thus reducing the throttle opening and releasing the clutch before the gear is disengaged. The continued movement of the lever 14 engages another gear, and as the fresh gear is engaged, also again changes over the switch 41, thus de-energizing the solenoid 148. If the relative engine and vehicle speeds are such that the driving member of the clutch is over-running the driven member, the clutch-controlled contacts 65 and 66 remain open, and the clutch servo-motor 36, as well as the throttle servo-motors 37 and 38, is connected to the atmosphere, so that the clutch re-engages and the throttle stop 107 is withdrawn. If, however, the driven member of the clutch is rotating at a higher speed than the driving member, the cam ring 74 is dragged forwardly by the driven plate 43, and the contacts 65 and 66 are bridged by the edge of the cam slot 82. The clutch being disengaged, the switch 163 is closed, and the solenoid 147 is therefore energised, moving the valve head 149 to connect the conduits 145 and 97 to suction and isolate them from the air inlet ports 153. As the solenoid 148 is now deenergised, the valve head 150 cuts off the conduit 146 from the suction, and that conduit is open to the atmosphere. The clutch servo-motor 36 is thus maintained operative to keep the clutch disengaged, and suction is applied to the chamber 126 of the servo-motor 38 to project the throttle stop 108 inwardly. The engine is thus speeded up until the clutch driving member begins to over-run the driven member, and the cam ring 74 is dragged backwardly to open the contacts 65, 66, and thus deenergize the solenoid 147. The clutch then re-engages, and the throttle stop 108 is retracted, leaving the throttle valve free for manual control. The throttle stops 107 and 108 override any setting of the throttle valve by the accelerator pedal, the spring link 109 being extended or shortened to allow the throttle setting to change without alteration of the position of the accelerator pedal.

When the clutch servo-motor 36 is operated to release the clutch, the pull rod 57 moves relatively to the valve body 91, against the spring 96, and the valve disc 95 is moved away from its seat. When the servo-motor allows the clutch to reengage, the valve disc remains off its seat until initial contact of the clutch plates reduces the load in the pull rod, the spring 96 then urging the valve disc on to its seat, and thus reducing the rate of engagement of the clutch, the air then entering the working chamber 88 of the servo-motor only through the variable restriction device 99. As the needle 101 of this device is mechanically linked to the accelerator pedal, in such a way as to cause the restriction to decrease as the throttle valve is opened, the speed of engagement of the clutch varies with the engine speed.

Figures 7 to 11 inclusive show a modified arrangement of the clutch controlled contacts by means of which clutch re-engagement is allowed to take place only if the driving and driven members are in substantial synchronism, relative rotation in either direction preventing re-engagement. The cam ring 172 in this arrangement, which is mounted in a similar manner to the cam ring 74 previously described, is formed with a cam slot 173 of which the central portion is spaced further from the axis of the ring than are the ends, the slot being symmetrical about a radius of the ring passing through the centre of the slot. The insulating block 64 carries three contact fingers 174, 175 and 176, the central finger 174 being connected to the cover plate 40, whilst the side fingers 175 and 176 are connected respectively to insulated slip rings 177 and 178 mounted on the cover plate 40 and engaged by spring loaded brushes 179 and 180 mounted in the insulating block 72. The brush 179 and slip ring 177 connect the contact finger 175 to the coil of the relay 165 previously described, and the contact fingers 174, 175, when both in contact with the edge of the cam slot 173 thus produce the same effect as the contact fingers 65 and 66 previously described. The contact finger 176 is connected, through the slip ring 178 and brush 180 to a conductor 181 (Figure 11) which is in turn connected, through the energising coil of a relay 182, to the switch 170 and so to the battery 159. The contacts 183 of the relay 182, when closed due to energisation of the relay, complete, if the contacts 174, 176 are also closed, a circuit through the solenoid 148, in parallel with the switch 41.

Figures 8, 9 and 10 which are diagrammatic views showing the cam ring 172 and the contacts 174, 175, 176 as viewed from the rear of the clutch, show respectively the relative positions of the cam slot 173 and the contacts when the clutch members are rotating in synchronism, when the clutch driven member is over-running the driving member, and when the clutch driving member is over-running the driven member. In the position of Figure 8, the contact 174 is at the centre of the cam slot 173 and is engaging its outer edge, but both contacts 175 and 176 are spaced from the cam slot edge.

The positions shown in Figures 9 and 10 are those which the parts take up immediately following a movement of the gear lever 14 to effect a change of gear, before the clutch members have become synchronized, so that when the parts are in either of those positions the switch 41 connects the battery 159 to the solenoid 147, and the switch 163 is closed.

In the position of Figure 9, the cam ring 172 has been dragged forwardly by the driven plate, and the contact 175, as well as the contact 174, is engaging the edge of the cam slot 173, energising the relay 165 to close the contacts 164.

The solenoid 147 is thus energised, and, as described above, the stop 108 is projected inwardly to increase the throttle opening and speed up the engine until, when synchronism is achieved, the contact 175 leaves the edge of the cam slot and the solenoid 147 is de-energised, thus allowing the clutch to re-engage.

In the position of Figure 10, the cam ring 172 has been dragged backwardly by the driven plate, and the contact 176 is brought into engagement with the edge of the cam slot, thus completing a circuit through the relay 182 to close the contacts 183 and energise the solenoid 148, with the result that the throttle stop 107 is projected to reduce the throttle opening and slow down the engine. When the engine has slowed down sufficiently to achieve synchronism of the clutch members, the contact 176 leaves the edge of the cam slot and the solenoid 148 is de-energised, thus allowing the clutch to re-engage.

Rotation of the cam ring 172 is limited, as in the previously described arrangement, by stops 83 and 84 which co-operate with the insulating block 64.

In both the arrangements described herein, the cam ring is mounted on the clutch driven plate, and the contacts are mounted on the clutch driving member, but it will be understood that these positions can be reversed without affecting the operation of the system.

The clutch control system described herein may be used with any power-operated friction clutch, whether of the centrifugal type or of the type in which the engagement is effected solely by springs, and is not limited in its application to vehicle transmission systems. The automatic means for varying the engine speed to produce the desired speed relation between the clutch members may be omitted, it being left to the driver or other operator to vary the speed of the engine until the desired speed relation is achieved. The system may also be applied to vehicle transmissions in which the gear changing is fully automatic.

I claim:

1. A power transmission system including a friction clutch comprising a driving member, a driven member and resilient means urging said driven member into frictional engagement with said driving member, servo-motor means operable to disengage said clutch in opposition to the resilient means, means to maintain its servo-motor operative to hold the clutch disengaged and including a solenoid, an electric circuit including said solenoid and a source of electric current, switch means in said electric circuit, said switch means being responsive to variations in the speed relation of the driving and driven members of the clutch, and comprising contacts carried by one of said driving and driven clutch members, a contact closing member, co-operating abutments on said contact closing member and said one clutch member limiting angular movement of said contact closing member relative to said clutch member, and friction means acting between said contact closing member and the other of said driving and driven clutch members to turn said contact closing member relative to said one clutch member during relative movement of the clutch members, said contact closing member being dragged by said friction means to a contact closing position when the driven clutch member is rotating faster than the clutch driving member, and being dragged by said friction means to a contact opening position when the clutch driving member is rotating faster than the clutch driven member, whereby the servo-motor means is maintained operative to hold said clutch disengaged when the driven clutch member is rotating faster than the driving clutch member.

2. In combination, a friction clutch including driving and driven clutch members and means to open and close an electric circuit in response to changes in the speed relation between the said driving and driven clutch members, said means comprising contacts carried by one of said clutch members, a contact closing member mounted for rotation on said other clutch member, co-operating abutments on said one clutch member and said contact closing member limiting rotary movement of said contact closing member relative to said one clutch member, co-operating friction means on said contact closing member and said other clutch member, and means on said contact closing member to close said contacts when the said contact closing member is at one limit of its rotary movement relative to the one clutch member and to open the said contacts when the said contact closing member is at the other limit of its rotary movement relative to said one clutch member, rotary movement of the contact closing member relative to the one clutch member to open and close the contacts being produced by friction between said friction means when the driving and driven clutch members rotate at different speeds.

3. In combination, a friction clutch including driving and driven clutch members and means to open and close an electric circuit in response to changes in the speed relation between the said driving and driven clutch members, said means comprising contacts carried by one of said clutch members, a cam ring mounted for rotation on said other clutch member, cooperating abutments on said one clutch member and said cam ring limiting rotary movement of said cam ring relative to said one clutch member, co-operating friction means on said cam ring and said other clutch member, and cam means on said cam ring to close said contacts when the said cam ring is at one limit of its rotary movement relative to the one clutch member and to open the said contacts when the said cam ring is at the other end of its rotary movement relative to said one clutch member, rotary movement of the cam ring relative to the one clutch member to open and close the contacts being produced by friction between the friction means when the driving and driven clutch members rotate at different speeds.

4. In combination, a friction clutch including driving and driven members and means to open and close an electric circuit in response to changes in the speed relation between the driving and driven members, the clutch comprising a flywheel, a cover plate secured to one face of the flywheel, a driven plate and pressure plate means housed within the cover plate, and a circumferential series of springs acting between the cover plate and the pressure plate means to urge the pressure plate means towards the flywheel and thereby grip the driven plate between said flywheel and pressure plate means, and said circuit opening and closing means comprising an insulating block, means securing said block to the clutch cover plate, two circumferentially spaced contacts mounted on said insulating block, a cam ring, means rotatably mounting said cam ring on said clutch driven plate, co-operating friction means on said cam plate and clutch driven plate, projections on said cam ring co-operating with said insulating block to limit rotary movement of said cam ring relative to said clutch cover plate, a cam slot in said cam plate, and electrically conductive material forming an edge of said cam slot, said cam slot being of substantially spiral form, whereby the contacts are bridged by the electrically conductive edge of the cam slot when the cam ring is at one limit of its rotary movement relative to the clutch cover plate and are spaced from the said edge when the cam ring is at the other limit of its rotary movement relative to the clutch cover plate, rotary movement of the cam ring relative to the clutch cover plate to open and close the contacts being produced by friction between the friction means when the driving and driven clutch members rotate at different speeds.

5. In combination, a friction clutch including driving and driven members and means to open and close an electric circuit in response to changes in the speed relation between the driving and driven members, the clutch comprising a flywheel, a cover plate secured to one face of the flywheel, a driven plate and pressure plate means housed within the cover plate, and a circumferential series of springs acting between the cover plate and the pressure plate means to urge the pressure plate means towards the flywheel and thereby grip the driven plate between said flywheel and pressure plate means, and said circuit opening and closing means comprising an insulating block, means securing said block to the clutch cover plate, a centre contact and two side contacts mounted in angularly spaced relation on said insulating block, a cam ring, means rotatably mounting said cam ring on said clutch driven plate, co-operating friction means on said cam plate and clutch driven plate, projections on said cam ring co-operating with said insulating block to limit rotary movement of said cam ring relative to said clutch cover plate, a cam slot in said cam plate, and electrically conductive material forming an edge of said cam slot, said cam slot being curved inwardly towards the axis of the cam plate at both ends whereby the centre contact and one side contact are abridged by the electrically conductive edge of the cam slot when the cam ring is at one limit of its rotary movement relative to the clutch cover plate, and the centre contact and the other side contact are bridged by the electrically conductive edge of the cam slot when the cam ring is at the other limit of its rotary movement relative to the clutch cover plate, rotary movement of the cam ring relative to the clutch cover plate being produced by friction between the friction means when the driving and driven clutch members rotate at different speeds.

References Cited in the file of this patent

UNITED STATES PATENTS

| Number | Name | Date |
|---|---|---|
| 1,999,366 | Maybach | Apr. 30, 1935 |
| 2,070,341 | Saives | Feb. 9, 1937 |
| 2,080,484 | Hunt | May 18, 1937 |
| 2,080,487 | Kettering | May 18, 1937 |
| 2,110,675 | Pike | Mar. 8, 1938 |
| 2,134,519 | Kliesrath et al. | Oct. 25, 1938 |
| 2,164,865 | Keiper | July 4, 1939 |
| 2,164,923 | Houston | July 4, 1939 |
| 2,175,179 | Caserta | Oct. 10, 1939 |